United States Patent
Mamtimin et al.

(10) Patent No.: US 11,320,563 B2
(45) Date of Patent: May 3, 2022

(54) LAYER DENSITY MEASUREMENT USING A NARROW ENERGY ATTENUATION TRACK

(71) Applicant: Halliburton Energy Services, Inc., Houston, TX (US)

(72) Inventors: Mayir Mamtimin, Spring, TX (US); Jeffrey James Crawford, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/886,499

(22) Filed: May 28, 2020

(65) Prior Publication Data

US 2021/0373193 A1 Dec. 2, 2021

(51) Int. Cl.
*G01V 5/04* (2006.01)
*G01V 5/12* (2006.01)

(52) U.S. Cl.
CPC ............. *G01V 5/045* (2013.01); *G01V 5/125* (2013.01)

(58) Field of Classification Search
CPC ............................. G01V 5/045; G01V 5/125
See application file for complete search history.

(56) References Cited

U.S. PATENT DOCUMENTS

| | | | | |
|---|---|---|---|---|
| 5,451,779 A * | 9/1995 | Sproß | .................... | G01V 5/125 250/266 |
| 5,841,135 A * | 11/1998 | Stoller | .................... | G01V 5/125 250/269.3 |
| 7,292,942 B2 | 11/2007 | Ellis et al. | | |
| 9,322,949 B2 | 4/2016 | Mosse et al. | | |
| 2003/0155121 A1* | 8/2003 | Jones | ....................... | E21B 47/01 166/254.2 |
| 2006/0102834 A1* | 5/2006 | Mickael | .................... | G01V 5/08 250/269.1 |

(Continued)

FOREIGN PATENT DOCUMENTS

CN 203161209 8/2013

OTHER PUBLICATIONS

International Search Report and Written Opinion for Application No. PCT/US2020/036437, dated Feb. 24, 2021.

(Continued)

*Primary Examiner* — Blake C Riddick
(74) *Attorney, Agent, or Firm* — John Wustenberg; C. Tumey Law Group PLLC

(57) ABSTRACT

A method for determining a density may comprise disposing a nuclear density tool into a wellbore. The nuclear density tool may comprise a gamma source and a first gamma detector, wherein the first gamma detector and the gamma source are disposed on a longitudinal axis of the nuclear density tool. The method may further comprise transmitting an energy from the gamma source, detecting the energy reflected with the first gamma detector, recording a count rate of the energy at the first gamma detector, and identifying a density of a first layer from the count rate, a mass attenuation coefficient, and a source-to-detector distance. A system for determining a density may comprise a nuclear density tool. The nuclear density tool may comprise a gamma source configured to transmit an energy and a first gamma detector configured to detect reflected energy. The system may further comprise an information handling system.

20 Claims, 6 Drawing Sheets

(56) References Cited

U.S. PATENT DOCUMENTS

| | | |
|---|---|---|
| 2009/0043509 A1 | 2/2009 | Madigan et al. |
| 2010/0017134 A1* | 1/2010 | Steinman ................ E21B 43/04 |
| | | 702/8 |
| 2010/0263862 A1* | 10/2010 | Goodwin .............. E21B 49/082 |
| | | 166/252.5 |
| 2012/0119077 A1 | 5/2012 | Smaardyk et al. |
| 2013/0009049 A1* | 1/2013 | Smaardyk ............. E21B 47/002 |
| | | 250/269.3 |
| 2013/0020479 A1* | 1/2013 | Inanc ...................... G01V 5/08 |
| | | 250/254 |
| 2014/0052376 A1 | 2/2014 | Guo et al. |
| 2016/0291198 A1 | 10/2016 | Lee et al. |
| 2018/0180763 A1 | 6/2018 | Zhang et al. |
| 2019/0004205 A1 | 1/2019 | Lee et al. |
| 2019/0265384 A1 | 8/2019 | Jurczyk et al. |
| 2021/0048548 A1 | 2/2021 | Chang et al. |

OTHER PUBLICATIONS

U.S. Appl. No. 15/565,132, filed Oct. 6, 2017.
"Density profile unfolding from Compton scattering measurements in reflection geometry" by J.E.F., M. B., A.G., and V. S., X-ray Spectrum. 2007; 36: 20-26.
"A new approach to determining compensated density and Pe values with a spectral density tool", by G.L. Moake 1991 SPWLA.

* cited by examiner

LAYER DENSITY MEASUREMENT USING A NARROW ENERGY ATTENUATION TRACK

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

During the lifetime of the well the integrity of the cement, casing string, production tubing, and formation may be examined through one or more measurements. These measurements may be performed by a nuclear density tool. Existing nuclear density tools measure a bulk density of a single layer averaged over the depth of investigation, providing little information as to the variation in density as a function of radial distance from the sensor. Current density tools use the contrast between a near and far detector to apply a borehole correction to the density measured by the far detector. Usually the correction requires knowledge of the borehole environment, such as borehole size, standoff, and borehole fluid composition and density.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to systems and methods to measure the densities of individual annular layers within a depth of investigation using a nuclear density tool. This ability may be used in a cased-hole environment for cement evaluation since the individual cement layer(s) may be isolated. Additionally, methods and system may be used in an open-hole environment to determine formation density under normal conditions, in the presence of washouts or other conditions of large or non-uniform standoff, and when shallow invasion is present. Methods and system employ an optimized geometry to directly compute the densities of the various layers independently.

As discussed below, systems and methods disclosed may utilize a combination of radioactive gamma sources and multiple gamma detectors to measure densities of multiple annular layers. This nuclear density tool may include an optimized source-to-detector configuration to enhance the spectral sensitivities to multiple layers. Additionally, the method is developed by exploiting the unique geometrical characteristics and simple Compton scattering processes. In this method, it is assumed that all three layers and detector count rates are inter-related so that a feedback mechanism is built in to extract and refine each layer densities.

Figure 1:
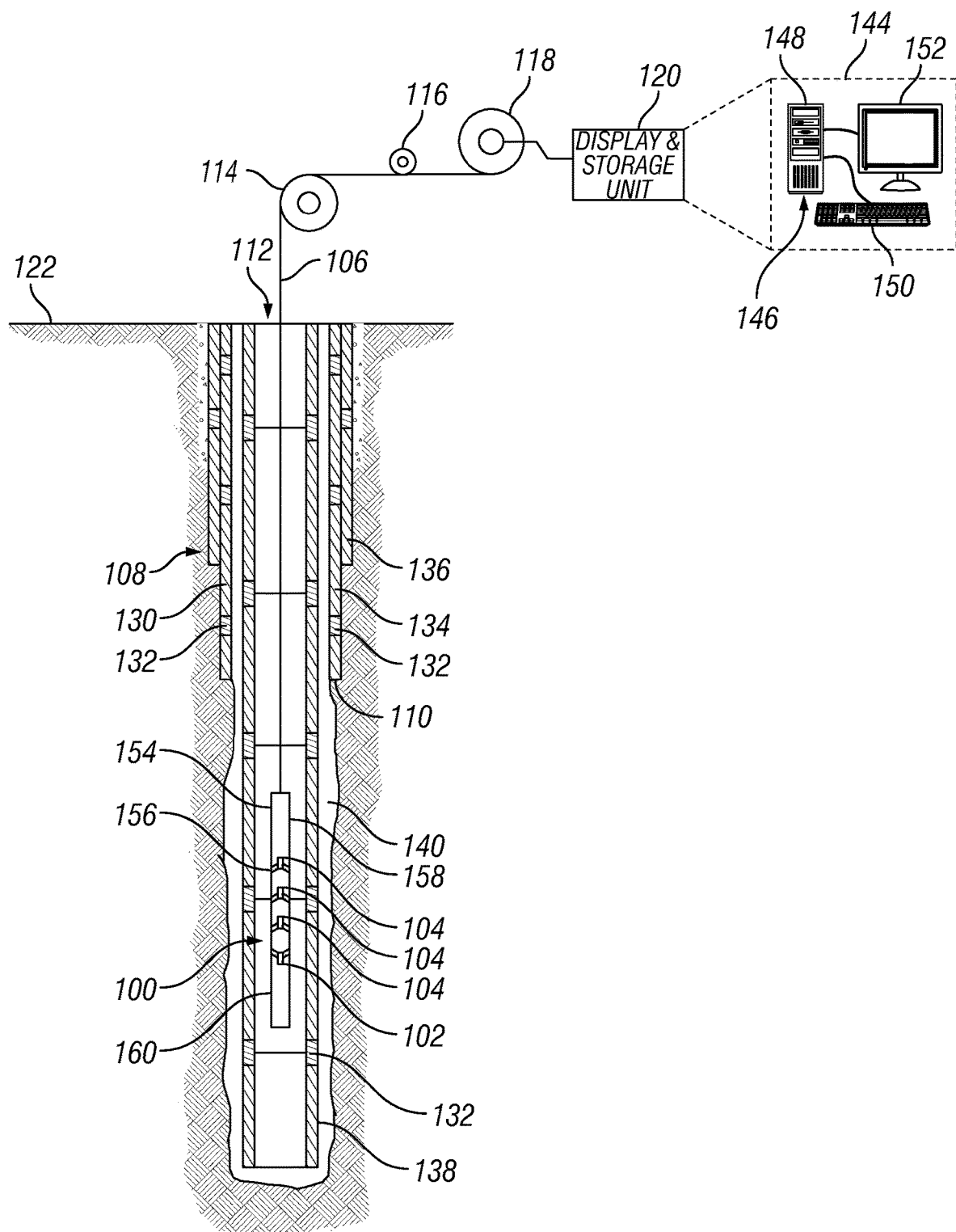
FIG. 1 illustrates an example of a nuclear density tool.

FIG. 1 illustrates an example operating environment for a nuclear density tool 100 as disclosed herein. Nuclear density tool 100 may comprise a gamma source 102 and/or a gamma detector 104. In examples, there may be any number of gamma sources 102 and/or any number of gamma detectors 104, which may be disposed on nuclear density tool 100. Nuclear density tool 100 may be operatively coupled to a conveyance 106 (e.g., wireline, slickline, coiled tubing, pipe, downhole tractor, and/or the like) which may provide mechanical suspension, as well as electrical connectivity, for nuclear density tool 100. Conveyance 106 and nuclear density tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110. Signals recorded by nuclear density tool 100 may be stored on memory and then processed by display and storage unit 120 after recovery of nuclear density tool 100 from wellbore 110. Alternatively, signals recorded by nuclear density tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to nuclear density tool 100. Typical casing string 108 may extend from wellhead 112 at or above ground level to a selected depth within wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Nuclear density tool 100 may be dimensioned so that it may be lowered into the wellbore 110 through pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between first casing 134 and second casing 136 (not illustrated).

In logging systems, such as, for example, logging systems utilizing the nuclear density tool 100, a digital telemetry system may be employed, wherein an electrical circuit may be used to both supply power to nuclear density tool 100 and to transfer data between display and storage unit 120 and nuclear density tool 100. A DC voltage may be provided to nuclear density tool 100 by a power supply located above ground level, and data may be coupled to the DC power conductor by a baseband current pulse system. Alternatively, nuclear density tool 100 may be powered by batteries located within the downhole tool assembly, and/or the data provided by nuclear density tool 100 may be stored within the downhole tool assembly, rather than transmitted to the surface during logging.

During logging operations, the operation and function of gamma source 102 and gamma detector 104 may be controlled by display and storage unit 120, which may include an information handling system 144. As illustrated, information handling system 144 may be a component of the display and storage unit 120. Alternatively, information handling system 144 may be a component of acoustic logging tool 100. Information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with nuclear density tool 100 and/or software executed by processing unit 146. For example, information handling system 144 may enable an operator to select analysis options, view collected log data, view analysis results, and/or perform other tasks. In examples, nuclear density tool 100 and information handling system 144 may be utilized to measure material density in a downhole environment that may surround nuclear density tool 100.

As further illustrated in FIG. 1, nuclear density tool 100 may include a housing 154 which may protect gamma source 102, gamma detector 104, and/or other devices disposed within logging tool 100. Housing 154 may include a material that may prevent the transmission of energy from gamma source 102 or receiving reflected energy by gamma detector 104. In examples, housing 154 may include cutout 156, which may be identified as holes or grooves. Cutouts 156 may be angled and may allow for transmission of energy from gamma source 102 and the sensing/receiving of reflected energy by gamma detector 104. Additionally, gamma source 102 and gamma detector 104 may be disposed in different sub housing or both may be disposed in the same sub housing. For example, gamma source 102 may be disposed in a first sub housing 158 and gamma detector 104 may be disposed in a second sub housing 160. It should be noted that all sub housing may be disposed within housing 154.

As illustrated, one or more gamma detectors 104 may be positioned on nuclear density tool 100 at selected distances (e.g., axial spacing) away from gamma source 102. The axial spacing of gamma detector 104 from gamma source 102 may vary, for example, from about 0 inches (0 cm) to about 40 inches (102 cm) or more. In some embodiments, at least one gamma detector 104 may be placed near the gamma source 102 (e.g., within at least 1 inch (2.5 cm) while one or more additional gamma detectors may be spaced from 1 foot (31 cm) to about 5 feet (152 cm) or more from the gamma source 102. It should be understood that the configuration of nuclear density tool 100 shown on FIG. 1 is merely illustrative and other configurations of nuclear density tool 100 may be used with the present techniques. In addition, nuclear density tool 100 may include more than one gamma source 102 and more than one gamma detector 104. For example, an array of gamma detectors 104 may be used. The gamma sources 102 may include any suitable acoustic source and/or transducer for generating acoustic waves downhole, including, but not limited to, monopole and multipole sources (e.g., dipole, cross-dipole, quadrupole, hexapole, or higher order multi-pole gamma sources). Specific examples of suitable gamma sources 102 may include, but are not limited to, piezoelectric elements, bender bars, or other transducers suitable for generating acoustic waves downhole. Gamma detector 104 may include any suitable acoustic gamma detector suitable for use downhole, including piezoelectric elements that can convert acoustic waves into an electric signal.

Figure 2:
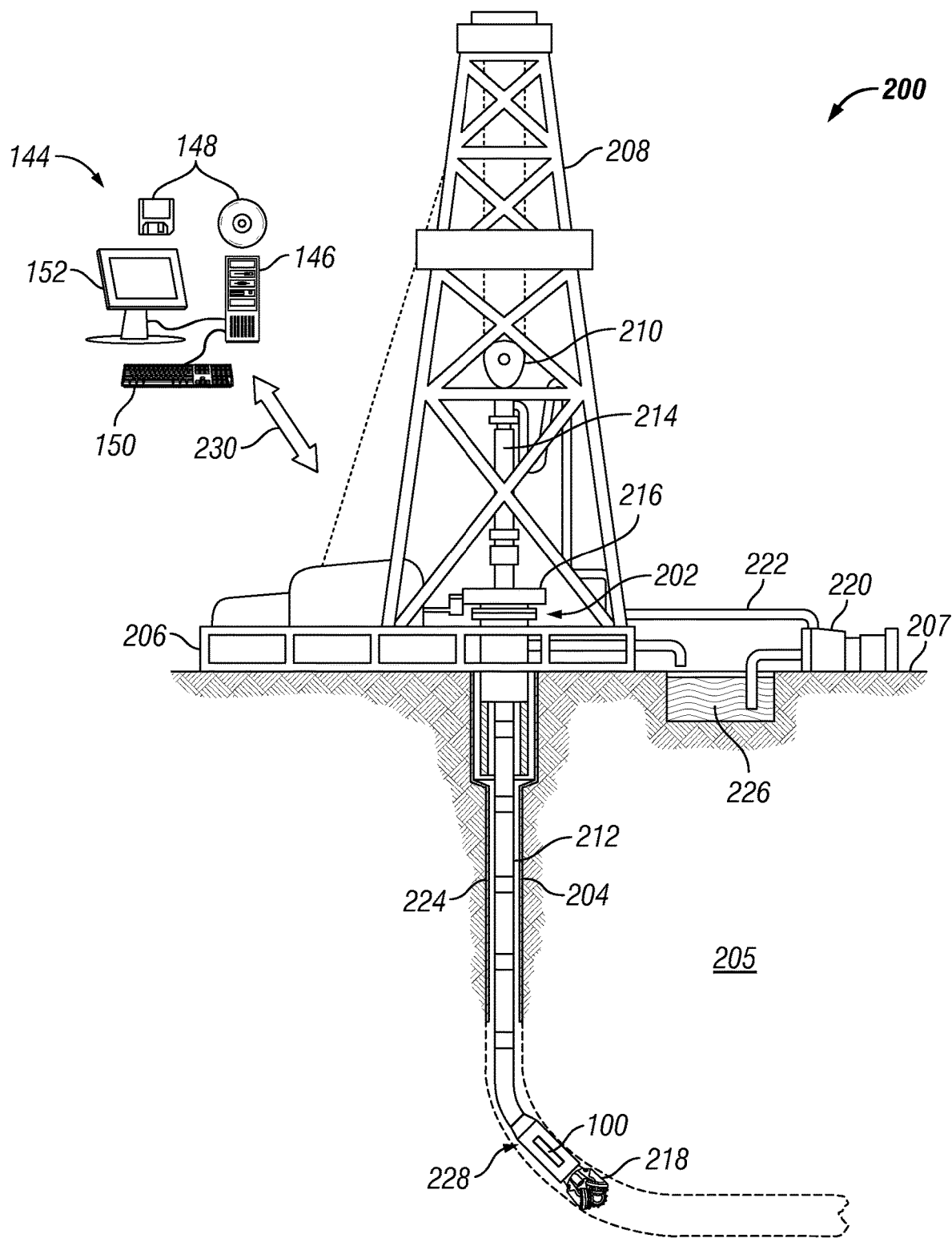
FIG. 2 illustrates another example of the nuclear density tool in a drill operation.

FIG. 2 illustrates an example in which nuclear density tool 100 may be disposed in a drilling system 200. As illustrated, borehole 204 may extend from a wellhead 202 into formation 205 from surface 207. Generally, borehole 204 may include horizontal, vertical, slanted, curved, and other types of borehole geometries and orientations. Imaging tools may be used in uncased sections of the borehole. Measurements may be made by imaging tools in cased sections for purposes such as calibration.

As illustrated, borehole 204 may extend through formation 205. As illustrated in FIG. 2, borehole 204 may extend generally vertically into the formation 205, however borehole 204 may extend at an angle through formation 205, such as horizontal and slanted boreholes. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 207. Without limitation, drill bit 218 may include, roller cone bits, PDC bits, natural diamond bits, any hole openers, reamers, coring bits, and the like. As drill bit 218 rotates, it may create and extend borehole 204 that penetrates various formations 132. A pump 220 may circulate drilling fluid through a feed pipe 222 to kelly 214, downhole through interior of drill string 212, through orifices in drill bit 218, back to surface 207 via annulus 224 surrounding drill string 212, and into a retention pit 226.

With continued reference to FIG. 2, drill string 212 may begin at wellhead 202 and may traverse borehole 204. Drill bit 218 may be attached to a distal end of drill string 212 and may be driven, for example, either by a downhole motor and/or via rotation of drill string 212 from surface 207 (Referring to FIG. 1). Drill bit 218 may be a part of bottom hole assembly 228 at distal end of drill string 212. Bottom hole assembly 228 may further comprise nuclear density tool 100 (Referring to FIG. 1). Nuclear density tool 100 may be disposed on the outside and/or within bottom hole assembly 228. As will be appreciated by those of ordinary skill in the art, bottom hole assembly 228 may be a measurement—while drilling (MWD) or logging-while-drilling (LWD) system.

Without limitation, bottom hole assembly 228 may be connected to and/or controlled by information handling system 114, which may be disposed on surface 207. Without limitation, information handling system 114 may be disposed down hole in bottom hole assembly 228. Processing of information recorded may occur down hole and/or on surface 207. Processing occurring downhole may be transmitted to surface 207 to be recorded, observed, and/or further analyzed. Additionally, information recorded on information handling system 114 that may be disposed down hole may be stored until bottom hole assembly 228 may be brought to surface 207. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 207. Alternatively, raw measurements from bottom hole assembly 228 may be transmitted to surface 207.

Any suitable technique may be used for transmitting signals from bottom hole assembly 228 to surface 207, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 207. Without limitation, an electromagnetic source in the telemetry subassembly may be operable to generate pressure pulses in the drilling fluid that propagate along the fluid stream to surface 207. At surface 207, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 207. Information handling system 114 may include a processing unit 146, a video display 152, an input device 150 (e.g., keyboard, mouse, etc.), and/or non-transitory computer-readable media 148 (e.g., optical disks, magnetic disks) that may store code representative of the methods described herein. In addition to, or in place of processing at surface 207, processing may occur downhole.

Figure 3:
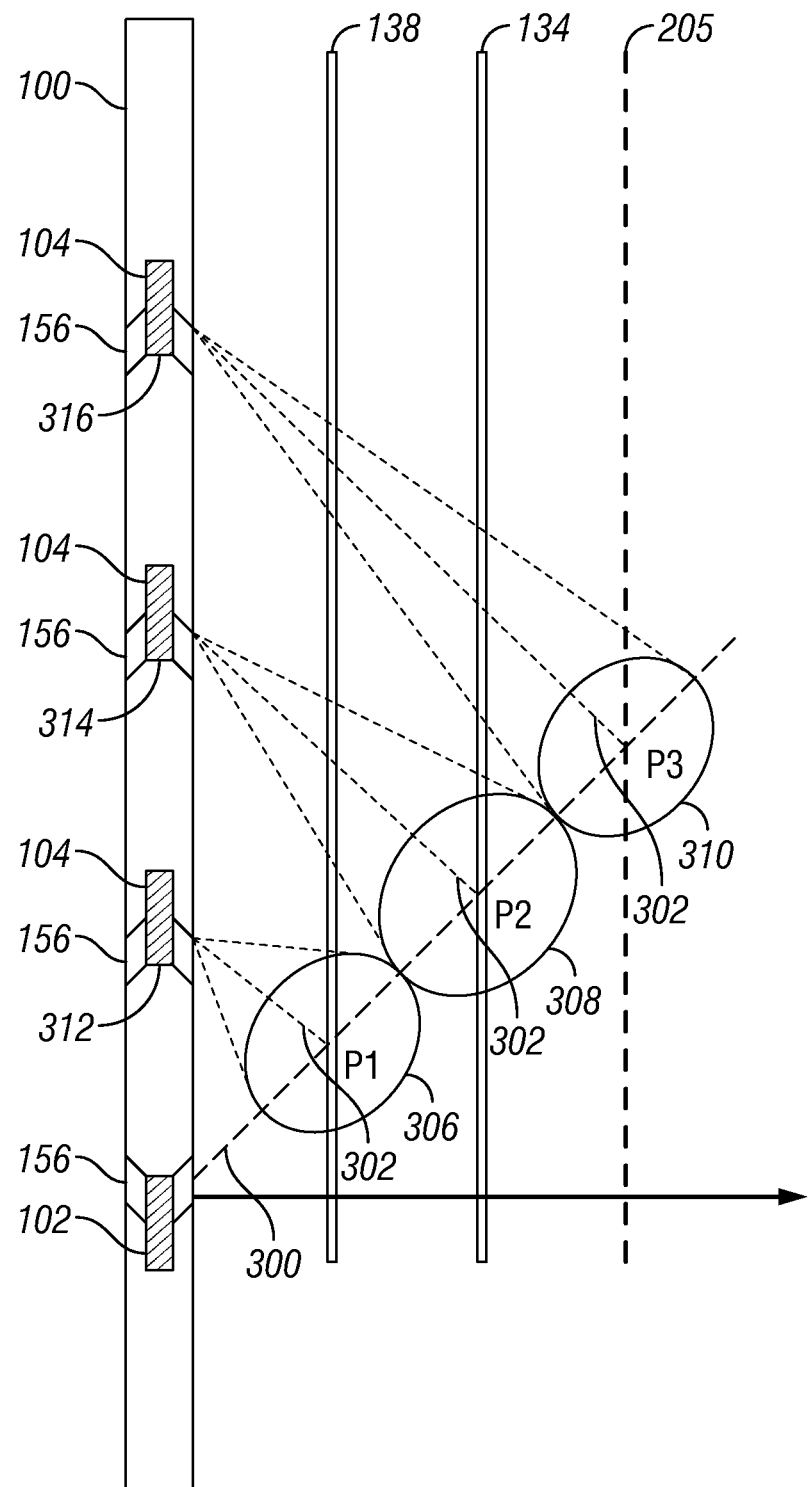
FIG. 3 illustrates an example measurement operation using the nuclear density tool.

FIG. 3 illustrates an example schematic of nuclear density tool 100 taking measurements. As illustrated, nuclear density tool 100 may measure the bulk electron density of the surrounding material based on a number of deflected gammas 300 detected by one or more gamma detectors 104 from a gamma source 102, in examples gamma source may be any radioactive source. Due to the inherent constrains of borehole environment, gamma source 102 and one or more gamma detectors 104 may be be disposed on the same longitudinal axis through nuclear density tool 100. The amount of gamma attenuation and deflection is directly proportional to the compactness of electrons in the surrounding material. The penetration depth of the gamma rays determines the sampling range of nuclear density tool 100. In contrast, existing nuclear density tools offer a mature and robust technology to measure material density in downhole environment. Additionally, existing nuclear density tools and calculation algorithms are designed to extract only a bulk density of the surrounding material averaging over the sampling range/thickness, therefore, lacking the ability to resolve any intrinsic differences in individual annular layers within that volume.

Nuclear density tool 100 in FIG. 3 may be manufactured with a source-to-detector configuration to enhance the spectral sensitivities to multiple layers. Utilizing a multiple Compton scattering scheme of high-energy photons, cut outs 156 may be utilized to focus the primary Compton scattering angles at any suitable angle. Isolated behavior of a high-energy photon in matter is described with Compton scattering, photoelectric absorption, and pair production. Current nuclear density tool may use high energy gamma source (between 661 keV and 1332 keV) and rely on detection of quantity and intensity of the returning gamma. In this method, only the Compton scattering and photoelectric absorption are dominant interaction mechanisms that may be considered. In contrast, nuclear density tool 100 illustrated in FIG. 3 may utilize the photoelectric effect. The photoelectric effect only yields density and elemental information within the very near vicinity of nuclear density tool 100. Thus, the photoelectric effect may only be applicable for layer density measurements closest to nuclear density tool 100.

With continued reference to FIG. 3, measurement operations may utilize a single Compton scattering approximation to determine initial source-to-detector distances. Source-to-detector distances is defined as the length of travel of energy 300 from gamma source 102 to first layer 306, second layer 308, third layer 310, or any identified layer, where energy 300 is reflected, and to gamma detector 104. For example, gamma source 102 and one or more gamma detectors 104 collimation minimizes the complex behavior of gamma attenuation via multiple scattering. As illustrated, one or more cut outs 156 allow for gamma source 102 and each gamma detector 104 to "see" in at a specific angle and direction. During measurement operations, gamma source 102 may emit energy 300 out of nuclear density tool 100 through a cut out 156. Likewise, gamma detectors 104 may sense and/or detect reflected energy 302 at specific angles and directions from cut out 156. This may allow for a designated area to be measured by a specific gamma detector 104. For example, as illustrated in FIG. 3, designated areas may be divided into a first layer 306, a second layer 308, and a third layer 310. Each layer may be sensed specifically by a single specific gamma detector 104.

In examples, gamma source 102 and gamma detectors 104 may be collimated to allow narrow energy band gammas to be detected. A simple attenuation track approach may yield an efficient response function to unfold multiple layer densities. Since nuclear density tool 100 relies on detection of quantity and intensity of the returning energy from gamma source 102, only the Compton scattering is dominant interaction mechanism to be considered. For example, when energy is emitted from gamma source 102 at a collimated angle, it travels through the medium and subjected to be attenuated and scattered. Collimation angle is defined as the angle between the axis of cut out 156 and the longitudinal axis of nuclear density tool 100. For example, discussed below in FIG. 3, gamma source 102 cut out 156 angle is about 45 degree, and gamma detector 104 cut out 156 angle is 135 degree with respect to the longitudinal axis of nuclear density tool 100. The intensity of the scattered gamma at the detector location is expressed as:

$$CR = \frac{S}{4\pi r_1^2} * \frac{\rho N_A Z}{M} * \frac{d\sigma}{d\Omega} * \frac{A}{r_2^2} * \varepsilon * \exp[-\rho(\mu_1 r_1 + \mu_2 r_2)] \quad (1)$$

where, CR is the total count rate in energy channel, S is the source intensity in $B_q$, $r_1$ is the source to scatter point distance, and $r_2$ is the scatter point to detector distance. Additionally, $\rho$ is the bulk density of the point of scatter (or the density for attenuating media when different), A is the detector area in an xy plane, d is the source-to-detector distance, $\varepsilon$ is the detector full energy peak absolute efficiency, and $\mu$ is the attenuation coefficient at a specific energy. The variable $$\frac{d\sigma}{d\Omega}$$

is the Klein-Nishina cross section, $N_A$ is Avogadro's number, and Z, M is the atomic number and atomic mass.

Equation (1) lacks an exact analytical solution especially when considering all energies at all scattering angles in a non-uniform material matrix. However, when a specific scatter angle is chosen, the geometry and analytical solution may be solved quicker and more efficiently. For example, a 662 keV source gamma ray may experience a 90 degree Compton scattering when it travels through a medium that has several layers different densities. Along its path, source intensity will attenuate as a function of the bulk density of that layer. At the same time, the gamma ray may Compton scatter at 90 degree angle and the resultant 288 keV gamma continues to attenuate and may be detected by one or more gamma detectors 104. Thus, the total count rate at 288 keV in first gamma detector 312 may be simplified as:

$$CR_1 = A_1 \rho_1 e^{-\rho_1 \mu t_1} \quad (2)$$

where $A_1$ is a constant that absorbs all coefficients from gamma source 102 intensity, solid angle, gamma detector 104 efficiency, and Klein-Nishina scatter cross sections from Equation (1). The constant for $A_1$ is determined by characterization. Characterization may be performed by a computer simulation or lab experiment. Specifically, characterization may be performed by a coefficient matrix from Monte Carlo N-Particle (MCNP) computer simulations where the exact geometries of nuclear density tool 100 and borehole 204 are modeled with detailed physics to determine the $A_1$ coefficients. Characterization may also be performed by lab experiments where nuclear density tool 100 is disposed in well-known borehole fixtures to calibrate responses from nuclear density tool 100. A solid angle is defined as the product of cutout 156, discussed below, opening size and collimating angle of gamma source 102 and gamma detector 104.

Additionally, $\rho_1$ is the density of that first layer, $\bar{\mu}$ is the mass attenuation coefficient (i.e., averaging both 662 keV and 288 keV ($\bar{\mu}=\mu_{662keV}+\mu_{288keV}$), and where $t_1$ is the track length, source-to-detector, until it reaches the detector ($t_1=r_1+r_2$). Extending the method to other layer densities, second gamma detector 314 and third gamma detector 316 may be simplified to the following, respectfully:

$$CR_2 = A_2 \rho_2 e^{-\rho_1 \mu t_1 - \rho_2 \mu (t_2 - t_1)} \quad (3)$$

$$CR_3 = A_3 \rho_3 e^{-\rho_1 \mu t_1 - \rho_2 \mu (t_2 - t_1) - \rho_3 \mu (t_3 - t_2)} \quad (4)$$

where the track lengths are geometrically expressed as:

$$t_1 = \sqrt{2} d_1 \quad (5)$$

$$t_2 = \sqrt{2} d_2 \quad (6)$$

$$t_3 = \sqrt{2} d_3 \quad (7)$$

where $d_1$, $d_2$, $d_3$, are source-to-detector distances. With these, three detector count rates becomes:

$$CR_1 = A_1 \rho_1 e^{-\sqrt{2} \rho_1 \mu d_1} \quad (8)$$

$$CR_2 = A_2 \rho_2 e^{-\sqrt{2} \rho_1 \mu d_1 - \sqrt{2} \rho_2 \mu (d_2 - d_1)} \quad (9)$$

$$CR_3 = A_3 \rho_3 e^{-\sqrt{2} \rho_1 \mu d_1 - \sqrt{2} \rho_2 \mu (d_2 - d_1) - \sqrt{2} \rho_3 \mu (d_3 - d_2)} \quad (10)$$

From the Equations above, an initial estimate of first layer 306 ($\rho_1$) may be solved when gamma detector 104 (e.g., referring to FIG. 3) is set a coefficient $A_1$ is characterized either with MCNP or with a set of experimental data.

Figure 4:
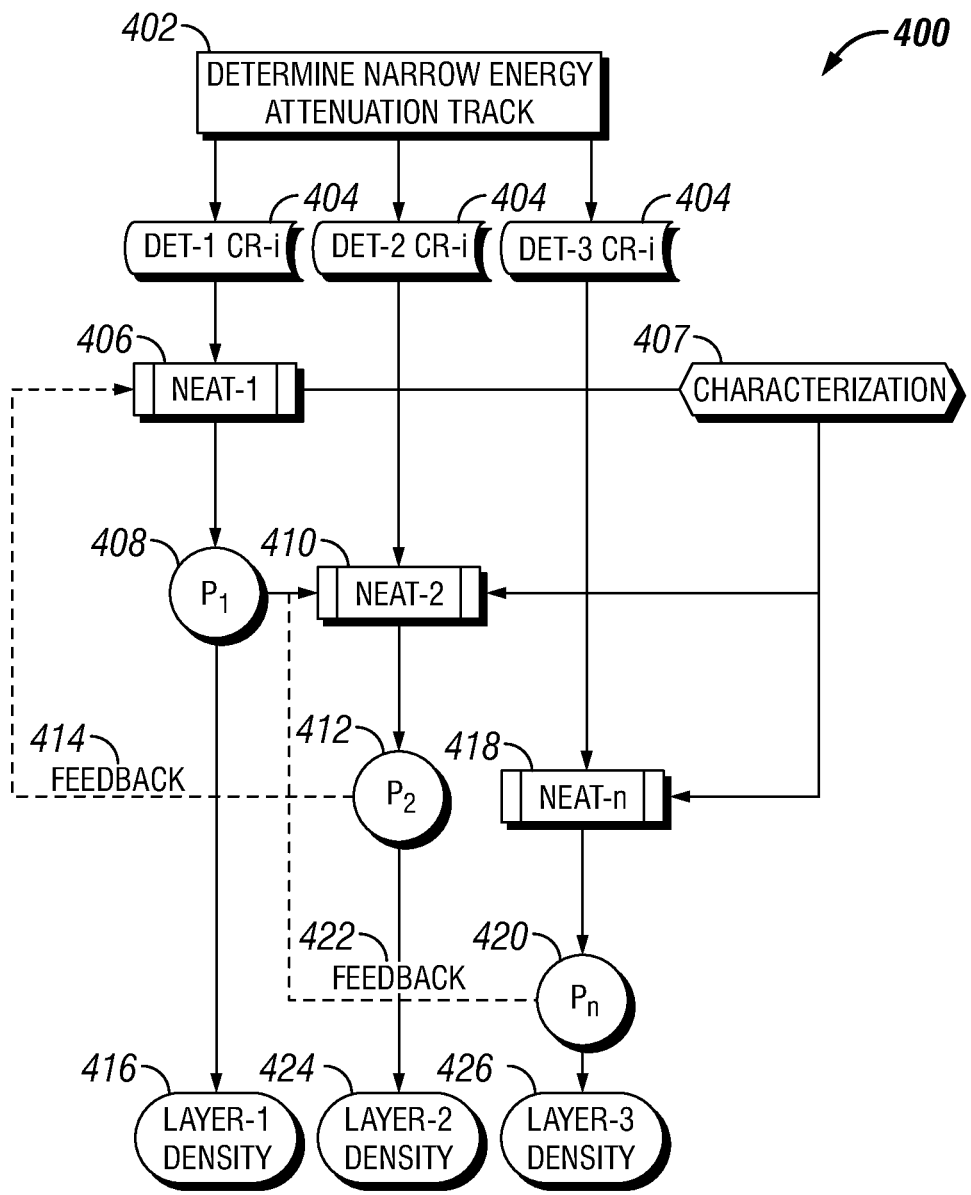
FIG. 4 is an example workflow for determining a density of an identified layer by the nuclear density tool.

FIG. 4 illustrates an example workflow 400 for calculating density at any layer, such as first layer 306, second layer 308, or third layer 310 (e.g., referring to FIG. 3). As illustrated, workflow 400 may begin with block 402. In block 402, a narrow energy attenuation track is determined. A narrow energy attenuation track determines gamma energy channel to be used in block 404. It also determines the collimation angle of block 156 and source-to-detector distance. In examples, determining the source-to-detector distance may also determine the spacing between gamma source 102 and gamma detector 104 along a longitudinal axis of nuclear density tool 100. After determining the narrow energy attenuation in block 402, in block 404 the count rate for each gamma detector 104 is measured and recorded. In block 406 the count rate for first layer 306, found in block 404, is used with Equation (8) to solve for a first density of first layer 306 and is identified as (pi) in block 408. Equation (8) is a Narrow Energy Attenuation Track (NEAT) function. To perform the calculation in block 408, a characterization from block 407 is added to the NEAT function in block 406. Each NEAT has coefficient matrix A as shown in Equation (2). This coefficient is determined by "characterization". Characterization may be performed by MCNP computer simulations where the exact geometries of nuclear density tool 100 and borehole 204 are modeled with detailed physics to determine the A coefficients. Characterization may also be performed by lab experiments where nuclear density tool 100 is disposed in well-known borehole fixtures to calibrate responses from nuclear density tool 100.

In block 410, the count rate for a second layer 308 from block 404 and the first density of first layer 306 from block 408 are fed into Equation (9) to determine the density of second layer 308 as ($\rho_2$) in block 412. In block 410, Equation (9) is characterized by block 407 in the same manner discussed above. In block 414, which is a feedback loop to refine ($\rho_1$), the density of second layer 308 is input into Equation (8) to determine a second density for first layer 306 in block 416. The second density for first layer 306 is a refined density that increases modality and measurement precision.

In block 418, the count rate for third layer 310 is used with the density of second layer 308 ($\rho_2$) in Equation (10) to determine a density of third layer 310 and is identified as ($\rho_3$) in block 420 ($\rho_1$) and used for the density of third layer 310 in block 426. In block 418, Equation (10) is characterized by block 407 in the same manner discussed above. This process may be repeated for density in any number of layers. As with block 414, block 422 is a feedback loop to refine ($\rho_2$). Specifically, the density of third layer 310 ($\rho_3$) from block 420 is put into Equation (9) to determine a second density for second layer 308 in block 412. In block 424, the second density for second layer 306 is a refined density that increase modality and measurement precision. The feedback concept in blocks 414 and 422 may be for any number of layers to refine the density for each layer. Each feedback loop may act as a correction mechanism that reflects a true physical phenomenon that each detector count rates are convoluted effect of all surrounding layers.

Figure 5A:
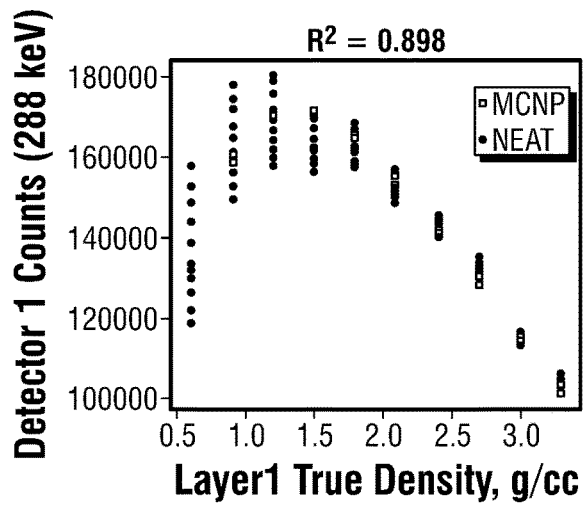
FIGS. 5A and 5B are example graphs of first layer density and error rate.
Figure 5B:
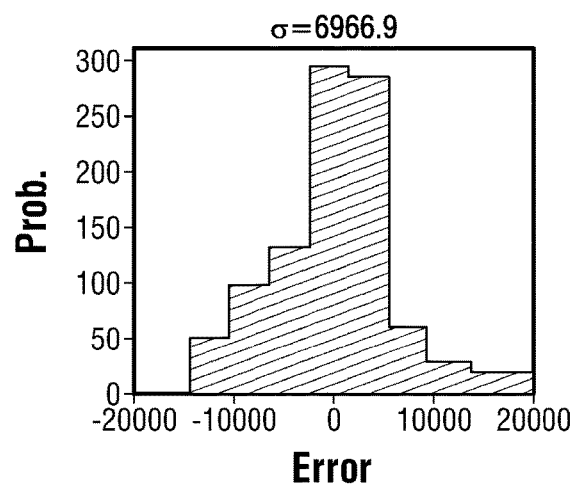

FIGS. 5A and 5B, utilizing theoretical data, illustrates estimation of density of first layer 306 (e.g., referring to FIG. 3) in block 406 and block 408 (e.g., referring to FIG. 4) in accordance with example embodiments. FIG. 5A illustrates R-squared values that only slightly differ from unity. For example, Equation (8) represents a function that may compute density based at least in part on count rates detected by gamma detectors 104. This function intends to predict a response of nuclear density tool 100 in a real measurement. R-squared is a statistical measure of how close actual data may be to the predictive function. Here, MCNP computer simulated data is used as real-life data. This is called computer characterization, which may be used in block 407. In other examples, actual data from an in lab environment is compared to this function to those to get R-squared. If a mathematical function is able to predict real-life data perfectly with 100% match, then R-squared is 1.

FIG. 5B illustrates systematic error that may be found using Equation (8). As Equation (8) may be used to predict a response of nuclear density tool 100, Equation (8) may introduce an inherent systematic error. This systematic error is represented by standard deviation when comparing the function and real-life data. FIG. 5A shows the comparison between the NEAT-1 function and MCNP real-life data. R-squared value of 0.898 shows that the NEAT-1 function cannot predict tool behavior perfectly in block 408 (e.g., referring to FIG. 1). FIG. 5B shows the distribution of that systematic error. It is semi-Gaussian, thus the function, Equation (8), is reliable. Therefor the solve first layer density in block 408 (e.g., referring to FIG. 4) should be used.

Figure 6A:
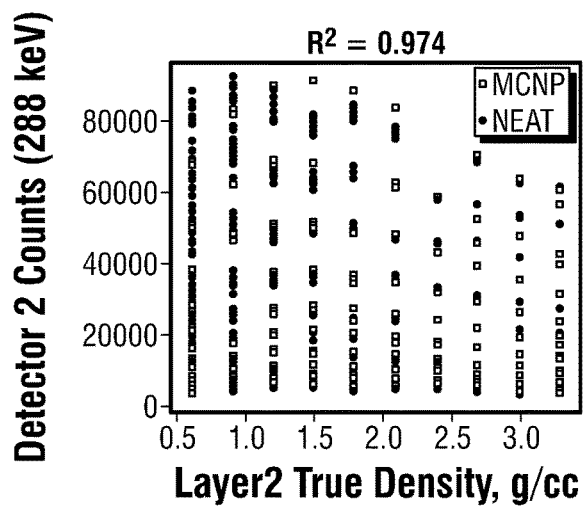
FIGS. 6A and 6B are example graphs of second layer density and error rate.
Figure 6B:
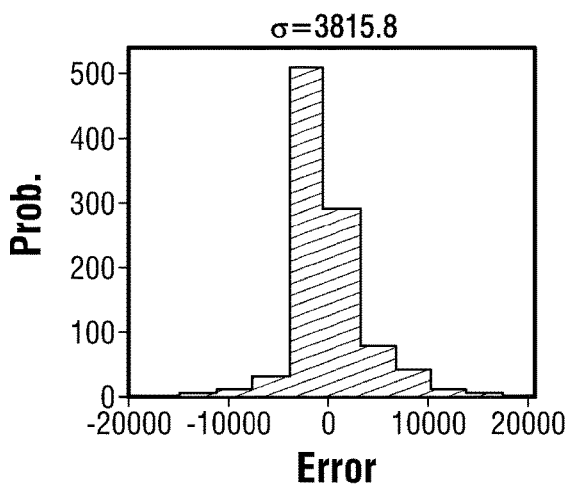

FIGS. 6A and 6B, utilizing theoretical data, illustrates estimation of density of second layer 308 (e.g., referring to FIG. 3) in block 410 and block 412 (e.g., referring to FIG. 4), in accordance with example embodiments. FIG. 6A, reflects second layer calculations in block 410 (e.g., referring to FIG. 4). As illustrated, the second layer predictive function NEAT-2 R-squared is 0.974, this means that the density of second layer 308 (e.g., referring to FIG. 3) prediction in block 412 fits. FIG. 6B, the distribution of systematic errors show that the distribution is similar to Gaussian, so the functions are reliable. This is because NEAT-2 takes density of first layer 306 (e.g., referring to FIG. 3) from block 408 density into account when calculating second layer density in block 410 (e.g., referring to FIG. 1). Additionally, NEAT-2 has feedback function, block 422 (e.g., referring to FIG. 4) that takes the density of third layer 310 (e.g., referring to FIG. 3) into account to correct itself.

Figure 7A:
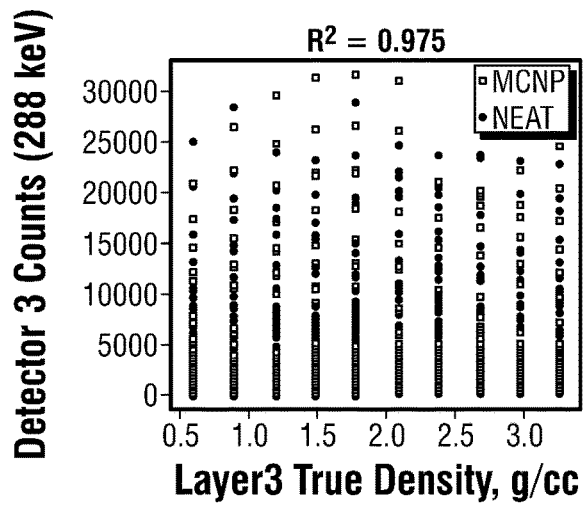
FIGS. 7A and 7B are example graphs of third layer density and error rate.
Figure 7B:
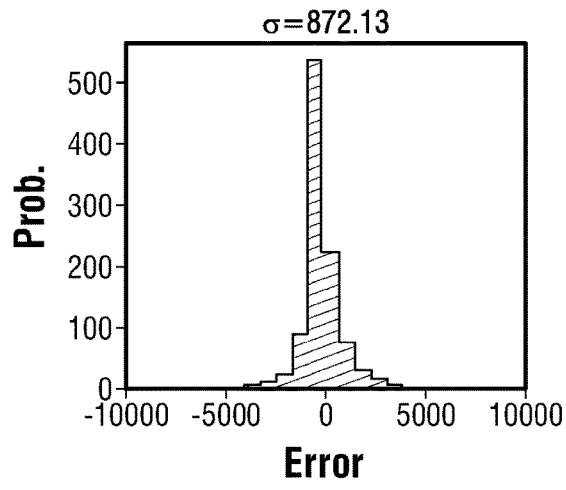

FIGS. 7A and 7B, utilizing theoretical data, illustrates estimation of density of third layer 310 (e.g., referring to FIG. 3) in block 418 and block 420 (e.g., referring to FIG. 4), in accordance with example embodiments. FIG. 7A, the density of third layer 310 (e.g., referring to FIG. 3) predictive function NEAT-3, in block 418) R-squared is 0.975, this means that the density of third layer 310 prediction has increase over NEAT-1 and NEAT-2. FIG. 7B, the distribution of systematic errors show that the distribution is similar to Gaussian, so the functions are reliable. This is because that NEAT-3 takes information from the density of first layer 306 (e.g., referring to FIG. 3) and the density of second layer 308 (e.g., referring to FIG. 3) to calculate the density of third layer 310 (e.g., referring to FIG. 3).

Figure 8A:
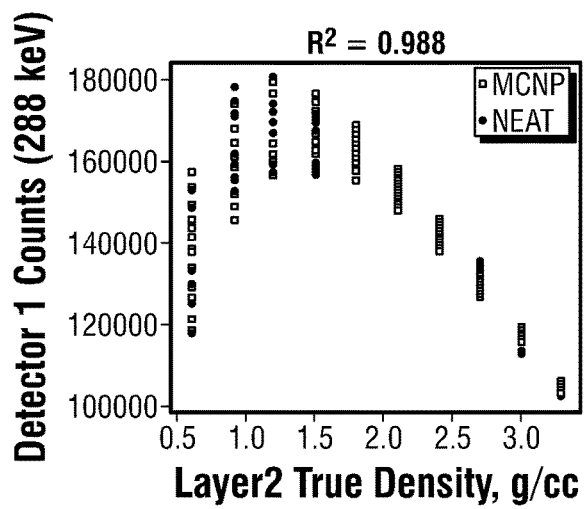
FIGS. 8A and 8B are example graphs of a second density of the first layer and error rate.
Figure 8B:
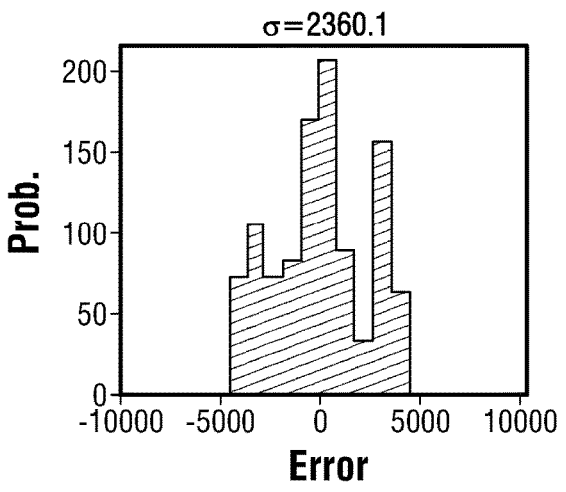

FIGS. 8A and 8B, utilizing theoretical data, illustrates estimation of the second density of first layer 306 (e.g., referring to FIG. 3) using feedback loop 414 (e.g., referring to FIG. 4), in accordance with example embodiments. FIG. 8A, this is re-computation of the density of first layer 306 (e.g., referring to FIG. 3) with the feedback loop in block 414 (e.g., referring to FIG. 4). Comparing this to FIGS. 5A and 5B, the results have improved over the original calculations.

The plots in FIGS. 5A-8B show the error in density of first layer 306 (e.g., referring to FIG. 3) is reduced from about 5% (0.11 g/ee) to around 1.7% (0.038 g/ee) in a representative point after feedback loop 414 (e.g., referring to FIG. 4). Density of second layer 308 and density of third layer 310 (e.g., referring to FIG. 3) accuracies may be about 5% at one sigma with error distributions tightly grouped around zero.

In current technology, methodologies for density sensors function and operate to initially compute a near and far density from two gamma detectors spaced at different distances to a gamma source. Near borehole perturbations are inferred by probing the contrast between the near and far density, by probing azimuthal sector variations in density, or by measuring standoff directly. These factors all lead to the computation of a density correction that is applied to the computed far density. The density of a discrete radial layer is not derived or computed. Therefore, current geometries and algorithms lack the ability to extract the density of a layer that is intermediately located within the total volume of investigation. Furthermore, the accuracy of traditional methods is highly correlated to the abundance and accuracy of the environmental parameters. The systems and methods described above tune the source-detectors configuration and collimation to be more sensitive to a specified radial layer, and then uses a simple symmetrical narrow energy attenuation track to find each layer densities. Instead of independently measuring all layer densities at once, this method has an inherent feedback loop to adjust and refine each layer density measurement with known values and details. The systems and methods may include any of the various features of the systems and methods disclosed herein, including one or more of the following statements.

Statement 1. A method for determining a density may comprise disposing a nuclear density tool into a wellbore. The nuclear density tool may comprise a gamma source and a first gamma detector, wherein the first gamma detector and the gamma source are disposed on a longitudinal axis of the nuclear density tool. The method may further comprise transmitting an energy from the gamma source, detecting the energy reflected with the first gamma detector, recording a count rate of the energy at the first gamma detector, and identifying a density of a first layer from the count rate, a mass attenuation coefficient, and a source-to-detector distance.

Statement 2. The method of statement 1, further comprising detecting a second count rate of the energy at a second gamma detector.

Statement 3. The method of statement 2, further comprising identifying a second density of a second layer from the density of the first layer, the second count rate, a mass attenuation coefficient, and a second source-to-detector distance.

Statement 4. The method of statement 3, wherein the density of the first layer is found using $$CR_2 = A_2\rho_2 e^{-\rho_1\mu t_1 - \rho_2\mu(t_2-t_1)},$$

wherein $CR_2$ is the second count rate, $A_2$ is a constant that absorbs all coefficients from the gamma source intensity, solid angle, and gamma detector efficiency, $\rho_2$ is the second density of the second layer, $\bar{\mu}$ is the mass attenuation coefficient, and $t_2$ is a track length.

Statement 5. The method of statement 4, wherein the track length is found with $t_2=\sqrt{2}d_2$, where $d_2$ is the second source-to-detector distance.

Statement 6. The method of statement 3, further comprising re-calculating the density of the first layer with the second density of the second layer, the count rate, the mass attenuation coefficient, and the source-to-detector distance.

Statement 7. The method of statements 1 or 2, wherein the density of the first layer is found using $$CR_1 = A_1\rho_1 e^{-\rho_1\mu t_1},$$

wherein $CR_1$ is the count rate, $A_1$ is a constant that absorbs all coefficients from the gamma source intensity, solid angle, and gamma detector efficiency, $\rho_1$ is the density of the first layer, is the mass attenuation coefficient, and $t_1$ is a track length.

Statement 8. The method of statement 6, wherein the track length is found with $t_1=\sqrt{2}d_1$, where $d_1$ is length of source-to-detector distance.

Statement 9. The method of statements 1, 2, or 7, wherein a third density of a third layer is found using $$CR_3 = A_3\rho_3 e^{-\rho_1\mu t_1 - \rho_2\mu(t_2-t_1) - \rho_3\mu(t_3-t_2)},$$

wherein $CR_3$ is a third count rate, $A_3$ is a constant that absorbs all coefficients from the gamma source intensity, solid angle, and gamma detector efficiency, $\rho_3$ is the third density of the third layer, $\bar{\mu}$ is the mass attenuation coefficient, and $t_3$ is a track length.

Statement 10. The method of statement 9, wherein the track length is found with $t_3=\sqrt{2}d_3$, where $d_3$ is length of the source-to-detector distance.

Statement 11. A system for determining a density may comprise a nuclear density tool. The nuclear density tool may comprise a gamma source configured to transmit an energy and a first gamma detector configured to detect reflected energy, wherein the gamma detector and the gamma source are disposed on a longitudinal axis of the nuclear density tool. The system may further comprise an information handling system connected to the nuclear density tool, wherein the information handling system is configured to identify a density of a first layer from a count rate, a mass attenuation coefficient, and a length of a source-to-detector distance.

Statement 12. The system of statement 11, further comprising a second gamma detector configured to detect a second count rate of the energy.

Statement 13. The system of statement 12, wherein the information handling system is further configured to identify a second density of a second layer from the density of the first layer, the second count rate, a mass attenuation coefficient, and a second source-to-detector distance.

Statement 14. The system of statement 13, wherein the density of the first layer is found using $$CR_2 = A_2\rho_2 e^{-\rho_1\mu t_1 - \rho_2\mu(t_2-t_1)},$$

wherein $CR_2$ is the second count rate, $A_2$ is a constant that absorbs all coefficients from the gamma source intensity, solid angle, and gamma detector efficiency, $\rho_2$ is the second density of the second layer, $\bar{\mu}$ is the mass attenuation coefficient, and $t_2$ is a track length.

Statement 15. The system of statement 14, wherein the track length is found with $t_2=\sqrt{2}d_2$, where $d_2$ is the second source-to-detector distance.

Statement 16. The system of statement 13, wherein the information handling system is further configured to re-calculate the density of the first layer with the second density of the second layer, the count rate, the mass attenuation coefficient, and the source-to-detector distance.

Statement 17. The system of statements 11 or 12, wherein the density of the first layer is found using $$CR_1 = A_1\rho_1 e^{-\rho_1 \mu t_1},$$

wherein $CR_1$ is the count rate, $A_1$ is a constant that absorbs all coefficients from the gamma source intensity, solid angle, and gamma detector efficiency, $\rho_1$ is the density of the first layer, is the mass attenuation coefficient, and $t_1$ is a track length.

Statement 18. The system of statement 17, wherein the track length is found with $t_1=d_1$, where $d_1$ is length of the source-to-detector distance.

Statement 19. The system of statements 11, 12, or 17, wherein a third density of a third layer is found using $$CR_3 = A_3\rho_3 e^{-\rho_1 \mu t_1 - \rho_2 \mu (t_2-t_1) - \rho_3 \mu (t_3-t_2)},$$

wherein $CR_3$ is a third count rate, $A_3$ is a constant that absorbs all coefficients from the gamma source intensity, solid angle, and gamma detector efficiency, $\rho_3$ is the third density of the third layer, $\bar{\mu}$ is the mass attenuation coefficient, and $t_3$ is a track length.

Statement 20. The system of statement 19, wherein the track length is found with $t_3=\sqrt{2}d_3$, where $d_3$ is length of the source-to-detector distance.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining a density comprising:
   disposing a nuclear density tool into a wellbore, wherein the nuclear density tool comprises:
     a gamma source; and
     a first gamma detector, wherein the first gamma detector and the gamma source are disposed on a longitudinal axis of the nuclear density tool;
   transmitting an energy from the gamma source;
   detecting the energy reflected with the first gamma detector;
   recording a count rate of the energy at the first gamma detector;
   identifying a density of a first layer from the count rate, a mass attenuation coefficient, and a source-to-detector distance;
   detecting a second count rate of the energy at a second gamma detector; and
   identifying a second density of a second layer from the density of the first layer, the second count rate, a mass attenuation coefficient, and a second source-to-detector distance.

2. The method of claim 1, wherein the density of the first layer is found using $$CR_2 = A_2\rho_2 e^{-\rho_1 \mu t_1 - \rho_2 \mu (t_2-t_1)},$$

wherein $CR_2$ is the second count rate, $A_2$ is a constant that absorbs all coefficients from the gamma source intensity, solid angle, and gamma detector efficiency, $\rho_2$ is the second density of the second layer, $\bar{\mu}$ is the mass attenuation coefficient, and $t_2$ is a track length.

3. The method of claim 2, wherein the track length is found with $t_2=\sqrt{2}d_2$, where $d_2$ is the second source-to-detector distance.

4. The method of claim 1, further comprising re-calculating the density of the first layer with the second density of the second layer, the count rate, the mass attenuation coefficient, and the source-to-detector distance.

5. The method of claim 1, wherein the density of the first layer is found using $$CR_1 = A_1\rho_1 e^{-\rho_1 \bar{\mu} t_1},$$

wherein $CR_1$ is the count rate, $A_1$ is a constant that absorbs all coefficients from the gamma source intensity, solid angle, and gamma detector efficiency, $\rho_1$ is the density of the first layer, $\bar{\mu}$ is the mass attenuation coefficient, and $t_1$ is a track length.

6. The method of claim 5, wherein the track length is found with $t_1 = \sqrt{2} d_1$, where $d_1$ is length of source-to-detector distance.

7. The method of claim 1, wherein a third density of a third layer is found using $$CR_3 = A_3\rho_3 e^{-\rho_1 \bar{\mu} t_1 - \rho_2 \bar{\mu}(t_2 - t_1) - \rho_3 \bar{\mu}(t_3 - t_2)},$$

wherein $CR_3$ is a third count rate, $A_3$ is a constant that absorbs all coefficients from the gamma source intensity, solid angle, and gamma detector efficiency, $\rho_3$ is the third density of the third layer, $\bar{\mu}$ is the mass attenuation coefficient, and $t_3$ is a track length.

8. The method of claim 7, wherein the track length is found with $t_3 = \sqrt{2} d_3$, where $d_3$ is length of the source-to-detector distance.

9. A system for determining a density comprising:
 a nuclear density tool, wherein the nuclear density tool comprises:
  a gamma source configured to transmit an energy; and
  a first gamma detector configured to detect reflected energy, wherein the gamma detector and the gamma source are disposed on a longitudinal axis of the nuclear density tool;
 an information handling system connected to the nuclear density tool, wherein the information handling system is configured to:
  record a count rate of the energy at the first gamma detector;
  identify a density of a first layer from the count rate, a mass attenuation coefficient, and a length of a source-to-detector distance;
  detect a second count rate of the energy at a second gamma detector; and
  identify a second density of a second layer from the density of the first layer, the second count rate, a mass attenuation coefficient, and a second source-to-detector distance.

10. The system of claim 9, wherein the density of the first layer is found using $$CR_2 = A_2\rho_2 e^{-\rho_1 \bar{\mu} t_1 - \rho_2 \bar{\mu}(t_2 - t_1)},$$

wherein $CR_2$ is the second count rate, $A_2$ is a constant that absorbs all coefficients from the gamma source intensity, solid angle, and gamma detector efficiency, $\rho_2$ is the second density of the second layer, $\bar{\mu}$ is the mass attenuation coefficient, and $t_2$ is a track length.

11. The system of claim 10, wherein the track length is found with $t_2 = \sqrt{2} d_2$, where $d_2$ is the second source-to-detector distance.

12. The system of claim 9, wherein the information handling system is further configured to re-calculate the density of the first layer with the second density of the second layer, the count rate, the mass attenuation coefficient, and the source-to-detector distance.

13. The system of claim 9, wherein the density of the first layer is found using $$CR_1 = A_1\rho_1 e^{-\rho_1 \bar{\mu} t_1},$$

wherein $CR_1$ is the count rate, $A_1$ is a constant that absorbs all coefficients from the gamma source intensity, solid angle, and gamma detector efficiency, $\rho_1$ is the density of the first layer, $\bar{\mu}$ is the mass attenuation coefficient, and $t_1$ is a track length.

14. The system of claim 13, wherein the track length is found with $t_1 = \sqrt{2} d_1$, where $d_1$ is length of the source-to-detector distance.

15. The system of claim 9, wherein a third density of a third layer is found using $$CR_3 = A_3\rho_3 e^{-\rho_1 \bar{\mu} t_1 - \rho_2 \bar{\mu}(t_2 - t_1) - \rho_3 \bar{\mu}(t_3 - t_2)},$$

wherein $CR_3$ is a third count rate, $A_3$ is a constant that absorbs all coefficients from the gamma source intensity, solid angle, and gamma detector efficiency, $\rho_3$ is the third density of the third layer, $\bar{\mu}$ is the mass attenuation coefficient, and $t_3$ is a track length.

16. The system of claim 15, wherein the track length is found with $t_3 = \sqrt{2} d_3$, where $d_3$ is length of the source-to-detector distance.

17. A system for determining a density comprising:
 a nuclear density tool, wherein the nuclear density tool comprises:
  a gamma source configured to transmit an energy; and
  a first gamma detector configured to detect reflected energy, wherein the gamma detector and the gamma source are disposed on a longitudinal axis of the nuclear density tool;
 an information handling system connected to the nuclear density tool, wherein the information handling system is configured to:
  record a count rate of the energy at the first gamma detector;
  identify a density of a first layer from the count rate, a mass attenuation coefficient, and a length of a source-to-detector distance wherein the density of the first layer is found using $CR_2 = A_2\rho_2\, e^{-\rho_1 \bar{\mu} t_1 - \rho_2 \bar{\mu}(t_2 - t_1)}$, wherein $CR_2$ is the second count rate, $A_2$ is a constant that absorbs all coefficients from the gamma source intensity, solid angle, and gamma detector efficiency, $\rho_2$ is the second density of the second layer, $\bar{\mu}$ is the mass attenuation coefficient, and $t_2$ is a track length;
  detect a second count rate of the energy at a second gamma detector; and
  identify a second density of a second layer from the density of the first layer, the second count rate, a mass attenuation coefficient, and a second source-to-detector distance.

18. A system for determining a density comprising:
 a nuclear density tool, wherein the nuclear density tool comprises:
  a gamma source configured to transmit an energy; and a first gamma detector configured to detect reflected energy, wherein the gamma detector and the gamma source are disposed on a longitudinal axis of the nuclear density tool;

an information handling system connected to the nuclear density tool, wherein the information handling system is configured to:

record a count rate of the energy at the first gamma detector;

identify a density of a first layer from the count rate, a mass attenuation coefficient, and a length of a source-to-detector distance wherein the density of the first layer is found using $CR_2 = CR_2 = A_2\rho_2\ e^{-\rho_1 \bar{\mu} t_1 - \rho_2 \bar{\mu}(t_2 - t_1)}$, wherein $CR_2$ is the second count rate, $A_2$ is a constant that absorbs all coefficients from the gamma source intensity, solid angle, and gamma detector efficiency, $\rho_2$ is the second density of the second layer, $\bar{\mu}$ is the mass attenuation coefficient, and $t_2$ is a track length, wherein the track length is found with $t_2 = \sqrt{2} d_2$, where $d_2$ is the second source-to-detector distance;

detect a second count rate of the energy at a second gamma detector; and identify a second density of a second layer from the density of the first layer, the second count rate, a mass attenuation coefficient, and a second source-to-detector distance.

19. A system for determining a density comprising:

a nuclear density tool, wherein the nuclear density tool comprises:

a gamma source configured to transmit an energy; and a first gamma detector configured to detect reflected energy, wherein the gamma detector and the gamma source are disposed on a longitudinal axis of the nuclear density tool;

an information handling system connected to the nuclear density tool, wherein the information handling system is configured to:

record a count rate of the energy at the first gamma detector;

identify a density of a first layer from the count rate, a mass attenuation coefficient, and a length of a source-to-detector distance;

detect a second count rate of the energy at a second gamma detector;

identify a second density of a second layer from the density of the first layer, the second count rate, a mass attenuation coefficient, and a second source-to-detector distance; and re-calculate the density of the first layer with the second density of the second layer, the count rate, the mass attenuation coefficient, and the source-to-detector distance.

20. A method for determining a density comprising:

disposing a nuclear density tool into a wellbore, wherein the nuclear density tool comprises:

a gamma source; and a first gamma detector, wherein the first gamma detector and the gamma source are disposed on a longitudinal axis of the nuclear density tool;

transmitting an energy from the gamma source;

detecting the energy reflected with the first gamma detector;

recording a count rate of the energy at the first gamma detector;

identifying a density of a first layer from the count rate, a mass attenuation coefficient, and a source-to-detector distance;

detecting a second count rate of the energy at a second gamma detector;

identifying a second density of a second layer from the density of the first layer, the second count rate, a mass attenuation coefficient, and a second source-to-detector distance;

detecting a third count rate of the energy at a third gamma detector; and identifying a third density of a third layer from the density of the first layer, the third count rate, a mass attenuation coefficient, and a third source-to-detector distance.

* * * * *

UNITED STATES PATENT AND TRADEMARK OFFICE
CERTIFICATE OF CORRECTION

PATENT NO. : 11,320,563 B2
APPLICATION NO. : 16/886499
DATED : May 3, 2022
INVENTOR(S) : Mayir Mamtimin and Jeffrey James Crawford It is certified that error appears in the above-identified patent and that said Letters Patent is hereby corrected as shown below:

In the Specification

Column 9, Line 14 please remove "pi" and replace with --p1--

In the Claims

Column 17, Line 13 please remove the extra "CR2="

Signed and Sealed this
Thirteenth Day of September, 2022

Katherine Kelly Vidal
*Director of the United States Patent and Trademark Office*